United States Patent Office 3,472,612
Patented Oct. 14, 1969

3,472,612
PROCESS FOR RECOVERING VANADIUM FROM AN ALKALI METAL VANADATE SOLUTION
Eugene J. Michal, Metuchen, and Arnold E. Nilsen, Freehold, N.J., assignors to National Lead Company, New York, N.Y., a corporation of New Jersey
No Drawing. Filed Sept. 11, 1967, Ser. No. 666,932
Int. Cl. C22b 59/00
U.S. Cl. 23—22    6 Claims

ABSTRACT OF THE DISCLOSURE

This invention covers a method for removing the vanadium values from an alkali metal vanadate solution to obtain a vanadium oxide product of high purity. The solution is treated with sulfuric acid to adjust the pH to 6.0 to 8.0 whereby aluminum values are precipitated and then removed. The filtrate is heated and an ammonium compound added, after which it is further heated and sulfuric acid added to adjust the pH to 1.5–3.0. The resulting solution is held at an elevated temperature to precipitate vanadium values substantially free of alkali metal and aluminum.

BACKGROUND OF THE INVENTION

There are many prior art processes for removing vanadium from an alkali metal vanadate solution. In most of these processes however the vanadium oxide obtained is contaminated with amounts of alkali metal salts and other impurities which are undesirable and are difficult to remove from the vanadium oxide product.

In contrast to most of these prior processes, the instant invention produces a vanadium oxide product of high purity.

SUMMARY OF THE INVENTION

This invention provides a process for treating an alkali metal vanadate solution to produce a vanadium oxide product, said process comprising the following steps:

(1) Adding sulfuric acid to an alkali metal vanadium solution in an amount sufficient to lower the pH of said solution from a pH of at least 9.0 to a pH which falls within the range of from 6.0 to 8.0, during which any aluminum values present in the alkali metal vanadate will be precipitated; (2) removing the precipitated aluminum values from the alkali metal vanadate solution by filtration and washing; (3) heating the alkali metal vanadate filtrate to at least 50° C. and adding thereto an ammonium compound selected from the group consisting of ammonium sulfate, ammonium carbonate, ammonium chloride and ammonia, the amount of said ammonium compound added being sufficient to obtain an ammonia to vanadium ratio which falls within the range of 0.13–0.26 parts ammonia (calculated as $NH_3$) to 1 part of vanadium (calculated as V); (4) heating the ammonium treated alkali metal vanadate solution to at least 90° C.; (5) to said heated solution, adding sulfuric acid with vigorous agitation at the point of contact in amount sufficient to reduce the pH of the solution to fall within the pH range of from 1.5 to 3.0; (6) after the acid has been added holding the mixture at a temperature of at least 90° C. for at least 15 minutes to complete the precipitation of the vanadium values; (7) filtering, washing, and drying said vanadium precipitate, said vanadium precipitate being substantially free from alkali metal and aluminum values. The main contaminant is the ammonium value which is easily removed by heating, thus producing a vanadium oxide of high purity.

DESCRIPTION OF PREFERRED EMBODIMENT

This process is directed particularly to a method for recovering the vanadium values from an alkali metal vanadate solution in which the weight ratio of the alkali metal (calculated as $Na_2O$) to vanadium (calculated as V) is from 1.0 to 3.0. This type of solution may be prepared by roasting a vanadium bearing ore with an alkali metal compound and leaching the roasted ore in water to solubilize the alkali metal vanadate values. The instant process is particularly useful in producing directly (i.e., without a re-precipitation step) a vanadium oxide of high purity from vanadium solutions containing this high amount of alkali metal. This type of solution usually has a pH of at least 9.0 and almost invariably contains some aluminum values in varying amounts in soluble form. Since sodium compounds are normally much cheaper than potassium compounds, the former are usually employed in the ore roasting operation, and therefore a sodium vanadate leach liquor is formed which is used as the starting solution for producing vanadium oxide.

An analysis of a typical sodium vanadate leach liquor will fall within the following ranges:

| | |
|---|---|
| $Na_2O$, g.p.l. | 60–90 |
| V, g.p.l. | 20–32 |
| $Na_2O$/V ratio | 1.8–3.0 |
| pH | 9–12 |

The leach liquor usually heated above 60° C. is agitated and to this solution is added sulfuric acid in amount to lower the pH to fall within the range of from 6.0 to 8.0. The concentration of the sulfuric acid preferably should lie between 40% and 95%. As the alumina precipitate is formed, the agitation should be reduced until the precipitate is just kept in suspension. The temperature of the mixture should be held between 50° C. and 90° C. for ½ to 2 hours to complete the precipitation. The alumina precipitate is then removed from the sodium vanadate liquor by filtering and washing.

After the alumina removal, the pH of the solution, if too high, i.e., above 7.0, preferably is adjusted to about 6.0 by adding an additional amount of sulfuric acid. (The purpose of this pH adjustment is to prevent the evolution and loss of ammonia during the subsequent ammonium compound addition).

An ammonium compound is then added to the solution which has been heated to at least 50° C. The amount of ammonium compound added is 0.13–0.26 part of ammonium (calculated as $NH_3$) for each part of vanadium (calculated as V). The ammonium compound added may be ammonium sulfate, ammonium chloride, ammonium carbonate, ammonium hydroxide or ammonia gas.

After the ammonium compound has been added, the mixture is heated to at least 90° C. while sulfuric acid is added with vigorous agitation at the point of contact until the pH is lowered to fall within the range of from 1.5 to 3.0. The entire mixture is agitated slowly. The ammonium compound and the sulfuric acid may be added at the same time provided that the ammonium compound is added before the pH of the solution is reduced to below 5.0.

After all of the sulfuric acid has been added, the mixture at above 90° C. is held at that temperature for at least 15 minutes up to 1½ hours to precipitate all of the vanadium values which are removed by filtering and washing.

When the vanadium values are precipitated in this manner, the product obtained is of high purity. Essentially all of the foreign matter present in the precipitated vanadium oxide is the ammonium content which is removed by volatilization when the vanadium oxide is heated. The sodium content in the product is exceptionally low, i.e., below 1.0% $Na_2O$.

It has been discovered that the purity of the final vanadium oxide product is dependent upon the manner in which the sodium vanadate solution is processed. For solutions containing a weight ratio of $Na_2O:V$ of at least 1.0, it is necessary to lower the pH of the solution in a step-wise manner before hydrolyzing the vanadium values for it has been found that if the pH of the solution is lowered directly from above 9.0 to a pH between 1.5 and 3.0 with an ammonium compound present, the vanadium precipitate produced contains an excessive amount of undesirable sodium or potassium values; and possesses a characteristic red color which is indicative of an impure sodium vanadate precipitate. Also any aluminum values present in the sodium vanadate solution precipitates out and are then redissolved as the pH is lowered.

In contrast, in the instant process, the pH of the sodium vanadate solution is lowered from pH above 9.0 to pH 6.0–8.0 at which time the aluminum values are precipitated and removed from solution by filtration. The aluminum-freed solution is then treated with more acid and an ammonium compound and the pH is lowered further to 1.5–3.0 whereupon the vanadium values are precipitated out. This vanadium precipitate is an ammonium polyvanadate composition which contains a very small amount of sodium and has a characteristic orange color.

It is not known whether the impure vanadium precipitate forms as a red cake because of the presence of aluminum values or because, at the high pH values, vanadium nuclei are formed which influence the precipitation of the impure vanadium values. In any event, using the stepwise lowering of the pH, according to this invention, with removal of the aluminum precipitate (and perhaps any impure vanadium nuclei) by filtration, the vanadium precipitate formed is of high purity.

In order to describe the instant invention in more detail, the following examples are presented:

EXAMPLE 1

A sodium vanadate leach liquor was prepared by roasting a vanadium-containing iron ore admixed with 3.5% $Na_2CO_3$ under oxidizing conditions and leaching the roasted ore in an aqueous system to solubilize the vanadium values. The leach liquor had the following analysis:

$Na_2O$, g.p.l. ------------------------------ 87
V, g.p.l. ------------------------------------ 31.6
$Na_2O/V$ ratio ------------------------------ 2.75
pH ------------------------------------------ 12.0

36.2 gallons of this leach liquor were heated to 76° C. 93% $H_2SO_4$ was added to the leach liquor with agitation at the rate of 0.05 gallons per minute until the pH of the liquor was lowered to 7.0. A total of 17 minutes was required. As the $H_2SO_4$ was added and the alumina content was precipitated, the agitation speed was reduced until the alumina precipitate was just kept in suspension. The leach liquor containing the alumina precipitate was held at 70° C. for 1 hour.

0.35 lbs. of filter aid were added and the alumina precipitate was removed from the leach liquor with filtration and thorough washing.

The vanadium-containing filtrate at 60° C. was then treated with an additional amount of 58% $H_2SO_4$ over a period of 3 minutes with rapid agitation which lowered the pH to 6.0.

In this example ammonia gas was introduced into the liquor and in order to maintain the pH at about 6.0, $H_2SO_4$ was added simultaneously with the ammonia. In this particular run ammonia was added at the rate of 0.11 pounds per minute while at the same time 0.55 pounds per minute of $H_2SO_4$ were added, the additions being made over a period of 20 minutes. This amount of ammonia was required to obtain an $NH_3:V$ ratio of 0.23.

After the ammonia had been added, the liquor was agitated and 58% $H_2SO_4$ was then added at the rate of 0.065 gallon per minute for 16 minutes to lower the pH of the liquor to 2.0 and to start the precipitation of the vanadium values. Agitation at the point of contact was vigorous. After the $H_2SO_4$ had been added, the liquor was heated to 95° C. and held at that temperature for 1 hour to complete the vanadium precipitation. The color of the precipitate was orange.

The vanadium precipitate was then removed from the liquor by filtration and thorough washing. The dried vanadium precipitate had the following analysis:

|  | Percent |
|---|---|
| $V_2O_5$ | 84.7 |
| $Na_2O$ | 0.7 |
| $Al_2O_3$ | 0.02 |
| $NH_4^+$ | 14.6 |

Upon heating the precipitate to 400° C. the ammonium values were removed by volatilization and a $V_2O_5$ product of high purity was obtained. It should be noted that the $Na_2O$ content of the product was very low even though the original leach liquor contained a high $Na_2O:V$ ratio. The vanadium recovery was 99.7%.

Apparently any red colored sodium vanadate nuclei which may have formed initially were removed with the alumina during the filtration step, thus permitting the formation of an orange vanadium precipitate.

EXAMPLES 2–4

Three additional runs were made using the procedure of Example 1. Variations were made in the composition of the starting solution, in the type of ammonium compounds employed and in the concentration of sulfuric acid used. The operational details and results obtained are recorded in the following table along with those of Example 1. In all of the examples the alumina was removed by filtration and the vanadium products obtained contained less than 1.0% $Na_2O$.

EXAMPLE 5

In this run the procedure of Example 3 was repeated except that the alumina precipitate formed was not removed from the solution, but permitted to redissolve in the solution as the pH was lowered to 1.5–3.0. In this run the vanadium precipitate was red in color instead of orange. After washing, drying and heating to remove the ammonium values, the vanadium product was analyzed and found to contain 5.7% $Na_2O$. Such a product is not of sufficient purity to be used for the aluminothermic production of ferro-vanadium. The results of this run are recorded in the table.

The filtration of the alumina values is necessary in order to produce a vanadium product low in sodium.

TABLE

| | Ex. 1 | Ex. 2 | Ex. 3 | Ex. 4 | Ex. 5 |
|---|---|---|---|---|---|
| Sodium Vanadate Leach Liquor: | | | | | |
| $Na_2O$, g.p.l. | 87 | 53 | 71 | 84 | Same as Ex. 3, except no $Al_2O_3$ filtration. |
| V, g.p.l. | 31.6 | 25.6 | 27.4 | 30.7 | |
| $Na_2O$:V ratio | 2.74 | 2.07 | 2.59 | 2.72 | |
| pH | 12.0 | 10.1 | 10.6 | 11.5 | |
| Gallons | 36.2 | 36 | 33 | 39 | |
| $Al_2O_3$ Precipitation: | | | | | |
| $H_2SO_4$, percent | 93 | 90 | 58 | 90 | |
| Gallons added | 0.85 | 0.54 | 1.06 | 0.84 | |
| Time of addition, min. | 17 | 19 | 32 | 15 | |
| Precipitation temp., °C | 76 | 73 | 71 | 71 | |
| pH | 7.0 | 6.6 | 7.0 | 6.4 | |
| Vanadium Hydrolysis: | | | | | |
| Ammonium compound used | $NH_3$ gas | $(NH_4)_2SO_4$ | $(NH_4)_2SO_4$, $NH_4OH$ | $(NH_4)_2SO_4$, $NH_4OH$ | |
| Amount used | 2.2 lbs | 6.1 lbs | 4.5 lbs., 0.264 gal | 6.0 lbs., 0.366 gal | |
| $NH_3$:V ratio | 0.23 | 0.20 | 0.22 | 0.24 | |
| $H_2SO_4$, percent | 58 | 90 | 58 | 58 | |
| $H_2SO_4$, gal. | 1.92 | 0.4 | 1.1 | 1.97 | |
| Addition time, min. | 16 | 37 | 32 | 16 | |
| $V_2O_5$ Product Dried: | | | | | |
| $V_2O_5$, percent | 84.7 | 88.3 | 86.7 | 88.7 | 89.9 |
| $Na_2O$, percent | 0.7 | 0.6 | 0.4 | 0.7 | 5.7 |
| V Recovery, percent | 99.7 | 97.9 | 99.3 | 98.2 | 87.1 |
| $V_2O_5$ Product Fused: $V_2O_5$, percent. | 96.4 | 99.0 | 98.1 | 98.2 | 94.0 |

We claim:

1. A method for the recovery of the vanadium values from an alkali metal vanadate solution to form vanadium pentoxide having an alkali metal content less than 1.0%, calculated as $Na_2O$, which comprises (1) treating an alkali metal vanadate solution containing soluble aluminum values with sulfuric acid to lower the pH of the solution from at least 9.0 to a pH which falls within the range of from pH 6.0 to 8.0, during which the aluminum values present in the alkali metal vanadate solution will be precipitated; (2) removing the precipitated aluminum values from the alkali metal vanadate solution by filtration and washing; (3) heating the alkali metal vanadate filtrate to at least 50° C. and adding thereto an ammonium compound selected from the group consisting of ammonium sulfate, ammonium carbonate, ammonium chloride and ammonia, the amount of said ammonium compound added being sufficient to obtain an ammonium to vanadium ratio which falls within the range of 0.13-0.26 part ammonium (calculated as $NH_3$) to 1 part of vanadium (calculated as V); (4) heating the ammonium treated alkali metal vanadate solution to at least 90° C.; (5) to said heated solution, adding sulfuric acid with vigorous agitation at the point of contact in amount sufficient to reduce the pH of the solution to fall within the pH range of from 1.5 to 3.0; (6) after the acid has been added, holding the mixture at a temperature of at least 95° C. for at least 15 minutes to complete the precipitation of the vanadium values; (7) filtering, washing and drying said vanadium precipitate, said vanadium precipitate being substantially free from alkali metal and aluminum values.

2. Method according to claim 1 in which the alkali metal vanadate solution employed is sodium vanadate, the ratio of $Na_2O$ to V being from 1.0-3.0.

3. Method according to claim 1 in which the ammonium compound employed is ammonia.

4. Method according to claim 1 in which the ammonium compound employed is ammonium sulfate.

5. Method according to claim 1 in which the ammonium compound employed is ammonium hydroxide.

6. Method according to claim 1 in which the pH of the solution after the aluminum values have been removed is reduced to pH of about 6.0 before the ammonium compound is added to the solution.

References Cited

UNITED STATES PATENTS

| | | | |
|---|---|---|---|
| 1,563,061 | 11/1925 | Baldeschwieler | 23—19.1 |
| 2,357,466 | 9/1944 | Frick | 23—22 |
| 2,357,998 | 9/1944 | Van Wirt et al. | 23—19.1 |
| 2,442,610 | 6/1948 | Meister | 23—140 |
| 2,551,733 | 5/1951 | Dunn et al. | 23—23 X |
| 3,190,719 | 6/1965 | Kelmers et al. | 23—22 |
| 3,190,720 | 6/1965 | Goren | 23—23 |

HERBERT T. CARTER, Primary Examiner

U.S. Cl. X.R.

23—23, 51, 140